United States Patent
Scholte-Wassink et al.

(10) Patent No.: US 11,946,444 B2
(45) Date of Patent: Apr. 2, 2024

(54) WIND TURBINE BLADES, WIND TURBINE BLADE ASSEMBLIES AND RELATED METHODS

(71) Applicant: General Electric Renovables Espana, S.L., Barcelona (ES)

(72) Inventors: Hartmut Scholte-Wassink, Salzbergen (DE); Andreas Starke, Salzbergen (DE); Willem Bakhuis, Nijverdal (NL)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 18/077,435

(22) Filed: Dec. 8, 2022

(65) Prior Publication Data

US 2023/0184210 A1 Jun. 15, 2023

(30) Foreign Application Priority Data

Dec. 9, 2021 (EP) .................................. 21383121

(51) Int. Cl.
  *F03D 1/06* (2006.01)

(52) U.S. Cl.
  CPC ...... *F03D 1/0675* (2013.01); *F05B 2260/964* (2013.01)

(58) Field of Classification Search
  CPC .... F03D 1/0675; F03D 13/10; F03D 1/06495; F03D 1/0677; F03D 1/0682; F03D 1/0684; F03D 7/0298; F03D 7/0296; F03D 80/30; F03D 80/301; F05B 2260/964; F05B 2240/302; F05B 2240/305; F05B 2260/96
  See application file for complete search history.

(56) References Cited

U.S. PATENT DOCUMENTS

| | | | |
|---|---|---|---|
| 8,012,299 B2 * | 9/2011 | Hancock | F03D 1/0675 29/889.7 |
| 8,479,581 B2 | 7/2013 | Herrig et al. | |
| 9,944,356 B1 * | 4/2018 | Wigley | B64C 3/48 |
| 10,267,289 B2 | 4/2019 | Fuglsang et al. | |
| 11,078,885 B2 * | 8/2021 | Akay | F03D 7/0232 |
| 11,346,320 B2 * | 5/2022 | Larsen | F03D 13/10 |
| 11,572,868 B1 * | 2/2023 | Seeley | F03D 80/50 |

FOREIGN PATENT DOCUMENTS

| | | | | |
|---|---|---|---|---|
| CN | 1533476 A | * | 9/2004 | ............ F03D 1/065 |
| EP | 2360374 A1 | | 8/2011 | |
| EP | 2520919 A2 | | 11/2012 | |
| EP | 3803105 A1 | | 4/2021 | |
| KR | 101566525 B1 | | 11/2015 | |
| WO | WO-2022106351 A1 | * | 5/2022 | |

OTHER PUBLICATIONS

European Search Report Corresponding to EP21383121 dated May 11, 2022.

* cited by examiner

*Primary Examiner* — Sabbir Hasan
*Assistant Examiner* — Arthur Paul Golik
(74) *Attorney, Agent, or Firm* — Dority & Manning, P.A.

(57) ABSTRACT

The present disclosure relates to wind turbine blades (22) configured to receive a peripheral device (250a, 250b, 250c) at a portion of the outer surface (211) of the blade (22), and wherein the wind turbine blade (22) is configured to magnetically couple to the peripheral device (250a, 250b, 250c). The present disclosure also relates to wind turbine blade assemblies (200) and methods (700) to provide the same.

16 Claims, 5 Drawing Sheets

WIND TURBINE BLADES, WIND TURBINE BLADE ASSEMBLIES AND RELATED METHODS

FIELD

The present disclosure relates to wind turbine blades, wind turbine blade assemblies and methods for providing the same.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly ("directly driven") or through the use of a gearbox. This way, the generator produces electricity which can be supplied to the electrical grid.

In order to extract more energy from the wind, the size of the rotor diameter is increased by increasing the dimensions of the wind turbine blades. The larger size of the blades introduces higher physical loads to the blade, including vibrations. The vibrations can occur during static and dynamic states. If a vibration frequency coincides with or is close to a resonance frequency of the wind turbines components, the oscillations may cause severe damage, like structural cracks. Different kinds of damping systems may be used to mitigate wind induced vibrations in the blade. These damping systems are generally located within and/or on the blade to absorb vibrations and alleviate related structural stresses in the blade. Passive tuned mass dampers are one solution than can be applied for this purpose.

Further, to enhance wind energy extraction and to control flow around the blade, aerodynamic devices may be coupled to the blade. These may promote flow attachment, resulting in an increase difference in pressure between the pressure side and the suction side of the blade.

Furthermore, aerodynamic devices configured to reduce vortex shedding may be added to blades temporarily, thereby mitigating vortex induced vibrations.

Dampers, aerodynamic devices and other peripheral devices are generally coupled to the wind turbine blade through the shell, so that a portion of these devices (i.e. a portion of the device or a fastening element) may protrude into the shell. In some cases, a section of the shell may be removed so that the device does not perforate the same. Further, these known devices can be directly connected to a load bearing structure of the blade.

In other cases, peripheral devices may be directly connected to the shell of the blade through fasteners and adhesives, or to the load bearing structure of the blade through the shell. In some additional cases, the peripheral devices may wrap a section of the blade, substantially covering both sides of the blade, i.e. the pressure side and the suction side.

The installation of known dampers, aerodynamic devices and other peripheral devices may result in a complex task and may require additional tools to secure them in place. Also, the outer surface of the blades can suffer damage in the mounting process. Further, before coupling these devices to the blade, the devices have to be precisely aligned with the dedicated blade region, and in some cases installation requires shell components to be removed and stored for later use.

The present disclosure provides examples of systems and methods that at least partially overcome some of the drawbacks of existing wind turbine blades and wind turbine blade assemblies.

SUMMARY

In a first aspect, a wind turbine blade is disclosed. The wind turbine blade extends in a longitudinal direction between a root end and a tip end and comprises a load-bearing structure extending in the longitudinal direction and a shell having an outer surface. Thus, the shell defines a pressure surface, a suction surface, a leading edge and a trailing edge. Further, the wind turbine blade is configured to receive a peripheral device at a portion of the outer surface of the blade, and is configured to magnetically couple to the peripheral device.

According to this first aspect, the wind turbine blade allows coupling peripheral devices in a fast and reliable manner, without the need of tools or additional components such as fasteners, adhesive or others. This results in a considerable reduction in assembly time as compared to known wind turbine blades for which the coupling of peripheral components may require additional equipment. Further, the alignment of the peripheral device with the wind turbine blade may be simplified due to the presence of a magnetic field, which may be tuned to magnetically couple specific regions to each other. Besides, the disclosed wind turbine blade allows coupling and uncoupling peripheral devices without affecting the integrity of the wind turbine blade and without removing wind turbine blade components such as shell portions.

In another aspect, a method for providing a wind turbine blade assembly is provided. The method comprises providing a wind turbine blade, providing a peripheral device and attaching the peripheral device to an outer surface of the wind turbine blade by magnetically coupling the peripheral device to the wind turbine blade.

Throughout this disclosure, the term "magnet" should be understood as a material or object that provides a magnetic field, and therefore encompasses permanent magnets and electromagnets. Further, it may be understood that a peripheral device is any additional device configured to be coupled or attached to a wind turbine blade to enhance the wind turbine blade performance or to serve as a tool for the wind turbine.

BRIEF DESCRIPTION OF THE DRAWINGS

Non-limiting examples of the present disclosure will be described in the following, with reference to the appended drawings, in which.

DETAILED DESCRIPTION OF EXAMPLES

Reference now will be made in detail to embodiments of the present disclosure, one or more examples of which are illustrated in the drawings. Each example is provided by way of explanation only, not as a limitation. In fact, it will be apparent to those skilled in the art that various modifications and variations can be made in the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

Figure 1:
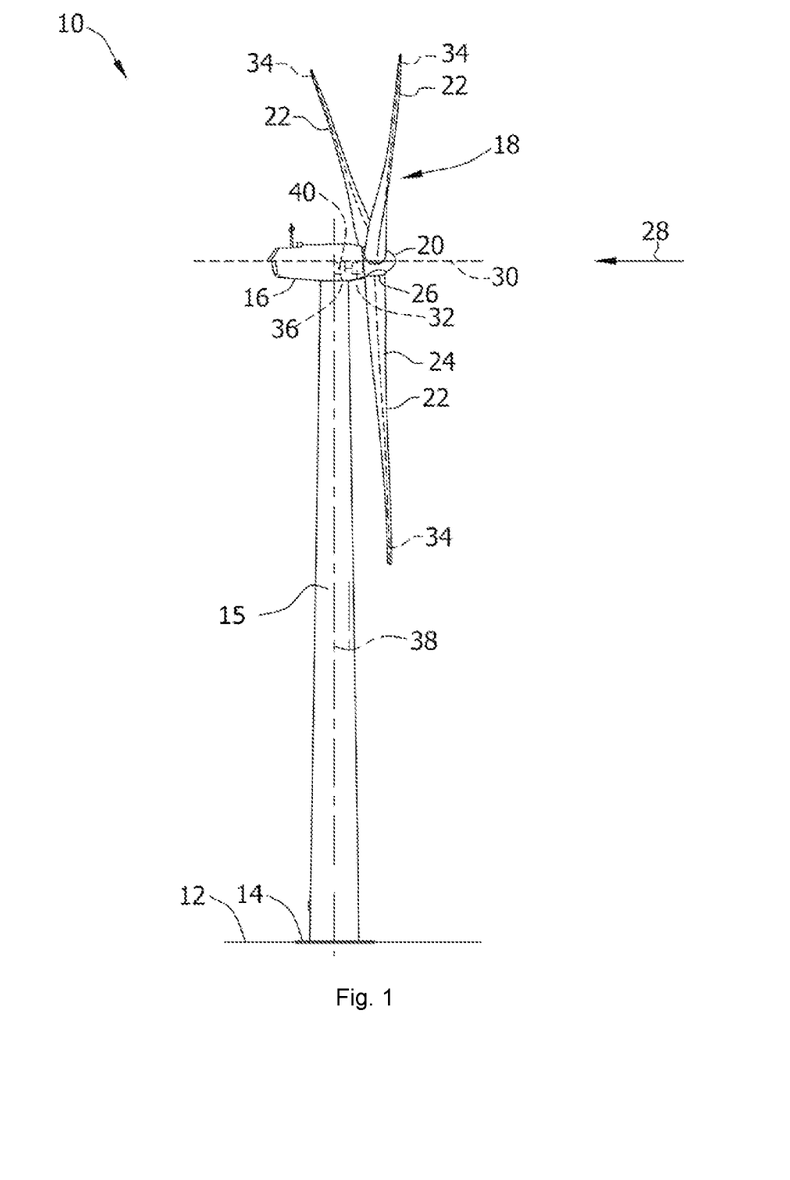
FIG. 1 illustrates a perspective view of a wind turbine according to one example.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote-control center. The wind turbine controller 36 includes a processor 40 configured to perform the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
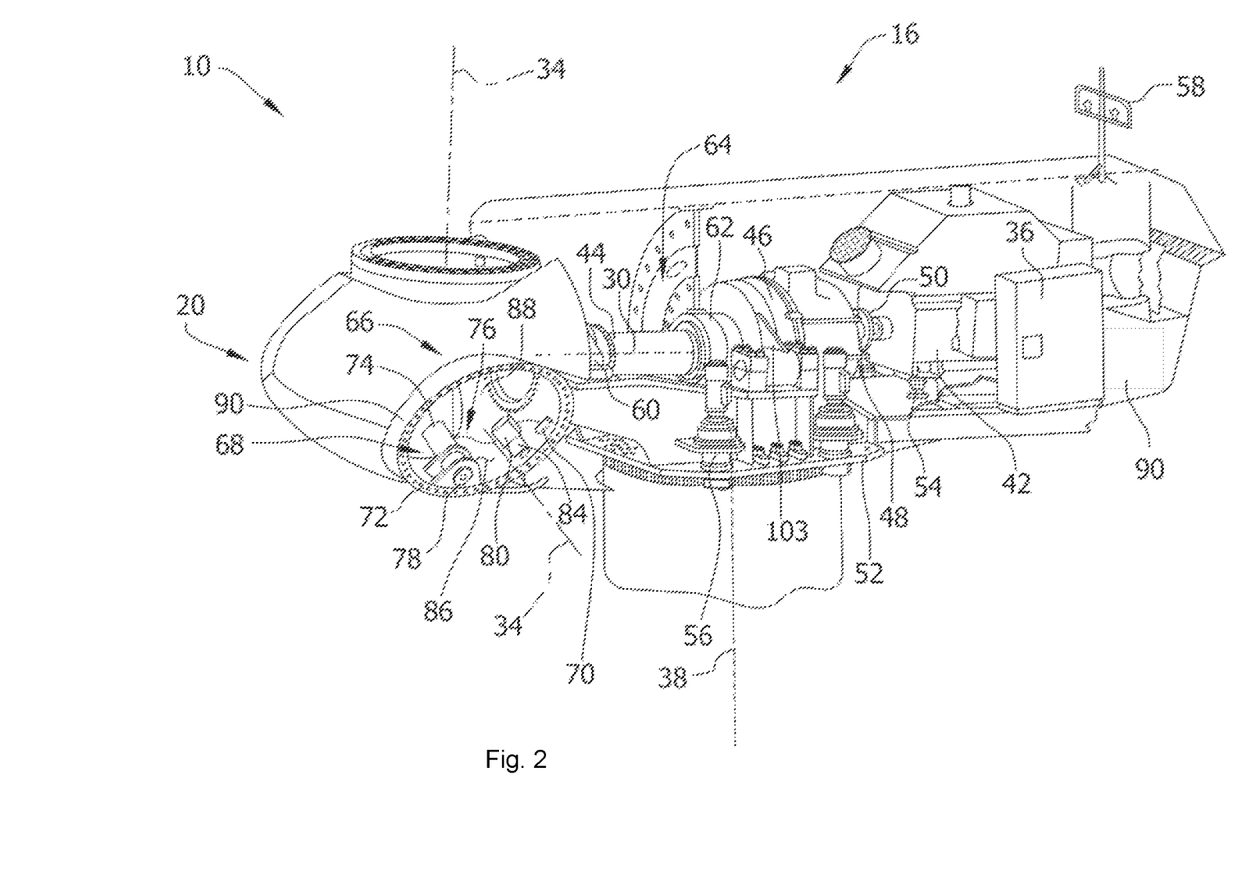
FIG. 2 illustrates a detailed, internal view of a nacelle of a wind turbine according to one example.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage of e.g. 400V to 1000 V into electrical energy having medium voltage (e.g. 10-35 KV). Offshore wind turbines may have for example generator voltages between 650 V and 3500 V, and transformer voltages may for instance be between 30 kV and 70 kV. Said electrical energy is conducted via power cables from the nacelle 16 into the tower 15.

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In some examples, the wind turbine may be a direct drive wind turbine without gearbox 46. Generator 42 operate at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system 58 which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angle of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface of hub 20 and may be coupled, directly or indirectly, to the outer surface.

Figure 3:
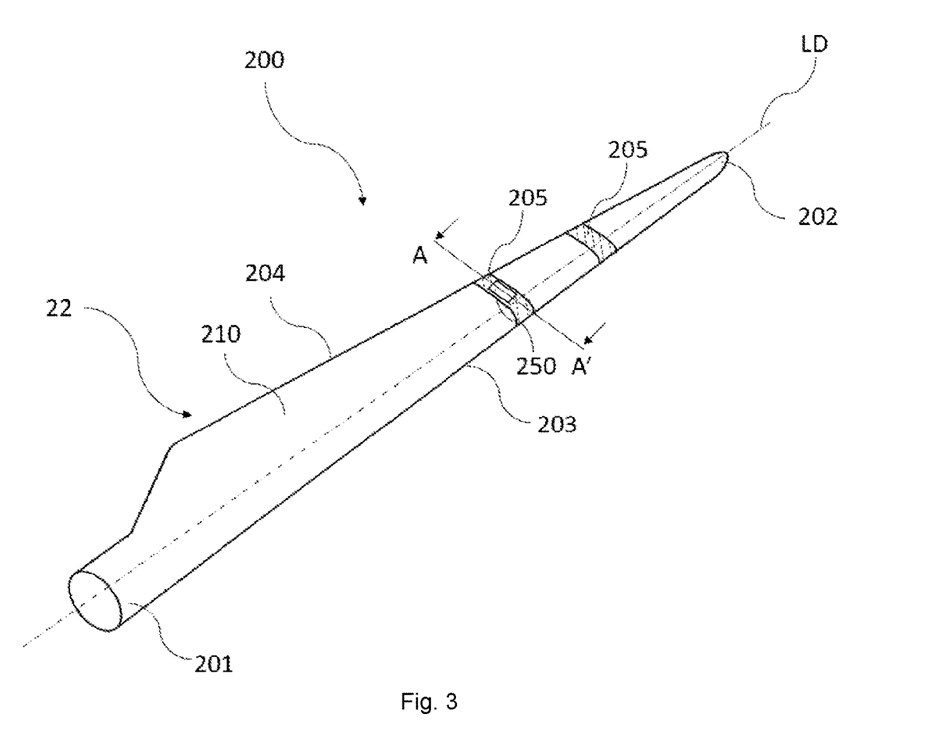
FIG. 3 schematically illustrates a wind turbine blade assembly according to one example.

FIG. 3 schematically illustrates a wind turbine blade 22 according to one example. The wind turbine blade 22 extends in a longitudinal direction LD between a root end 201 and a tip end 202. The wind turbine blade 22 comprises a shell 210 having an outer surface defining a pressure surface and a suction surface, a leading edge 203 and a trailing edge 204 and a load-bearing structure extending in the longitudinal direction LD, wherein the wind turbine blade 22 is configured to receive a peripheral device 250 at a portion of the outer surface of the blade, and wherein the wind turbine blade 22 is configured to magnetically couple to the peripheral device 250.

Additionally, FIG. 3 shows that the wind turbine blade 22 in this example comprises a first element 205 (represented with broken lines in FIG. 3) configured to magnetically couple to a second element (251*a*, 251*b* in FIGS. 4-6; collectively "251" herein) 251 of the peripheral device 250. One of the first and second elements 205, 251, may be a magnet, and the other of the first and second elements 205, 251 may be a magnet or a ferromagnetic element. For example, the first element 205 may be a ferromagnetic material attached to or embedded in the blade and the second element 251 may a magnet, or vice versa, or the first and second elements 205, 251 may both be magnets. In case the first and second elements 205, 251 are magnets, the magnets may be configured or arranged such as to generate magnetic attraction between each other.

In the example illustrated in FIG. 3, the first element 205 is laminated into or otherwise integrated in the shell 210 of the wind turbine blade 22. However, the first element 205 may be coupled to the wind turbine blade 22 in a variety of ways.

In some examples, the first element 205 may be a mesh integrated in the shell 210 by resin infusion, by adhesive or by other type of fasteners. The first element 205 may be attached or coupled to the shell at an inner side of the shell. This can be done during, or after, blade manufacturing depending on blade requirements.

In other examples, the first element 205 may be a ferromagnetic powder included in the shell 210, for example in a foam material of the shell 210. Additionally, the wind turbine blade may comprise a combination of two or more of the previously disclosed examples. For example, it may comprise a mesh integrated in the shell 210 in a portion of the wind turbine blade 22 and a ferromagnetic powder incorporated in another (or the same) portion of the wind turbine blade 22. These and other arrangements will be discussed in relation with FIGS. 4 to 6.

FIG. 3 also illustrates a wind turbine blade assembly 200 comprising a wind turbine blade 22 and a blade peripheral device 250. The wind turbine blade 22 extends in a longitudinal direction LD between a root end 201 and a tip end 202. The wind turbine blade 22 comprises a shell 210 having an outer surface defining a pressure side, a suction side, a leading edge 203 and a trailing edge 204. Further, the wind turbine blade 22 comprises a load-bearing structure, at an inside of the shell 210, extending in the longitudinal direction LD. As previously discussed, the wind turbine blade 22 in this example is configured to receive a peripheral device 250 at a portion of the outer surface of the blade 22. Further, the blade peripheral device 250 comprises a base configured to contact the outer surface of the shell 210, and it is configured to magnetically couple to the wind turbine blade 22. The wind turbine blade 22 may comprise a first element 205, and the peripheral device 250 may comprise a second element (see reference numeral 251 in FIGS. 4 to 6). One of the first and second elements 205, 251, may be a magnet and the other of the first and second elements 205, 251 may be either a magnet or a ferromagnetic element as explained before.

The example illustrated in FIG. 3 shows a wind turbine blade 22 with a first element 205 in two different locations. I.e. there are two "first elements". Note that the numbering of "first" element does not refer to the number of actual elements that are present or the order in which they are provided, but rather the "first elements" in this example are elements of the blade (e.g. integrated in the blade, attached to the blade, incorporated in the blade, coupled to the blade) that make magnetic coupling with a peripheral device possible, whereas the "second elements" in this example denote elements of the peripheral device that enable magnetic coupling.

Note that the number and distribution of the first elements 205 may depend on particular requirements of the wind turbine blade 22. For example, it may be possible to include a first element 205 substantially near the root end 201 to couple an aerodynamic device or other peripheral devices such as sensors or others. Similarly, it may be possible to couple one or more first elements 205 near the tip end 202 to couple other type of peripheral devices such as dampers to mitigate blade vibrations, i.e. passive tuned mass dampers.

Figure 4:
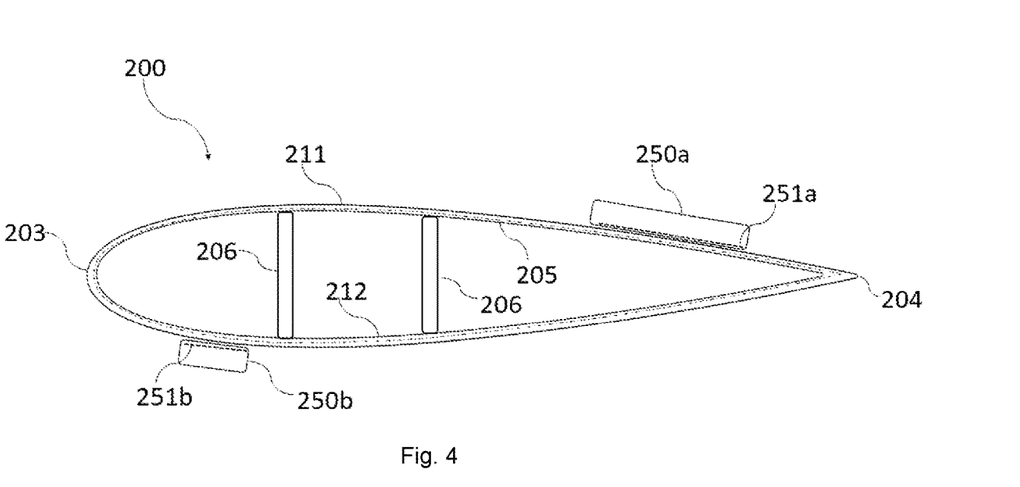
FIG. 4 schematically illustrates a wind turbine blade assembly according to another example through the plane A-A'.
Figure 5:
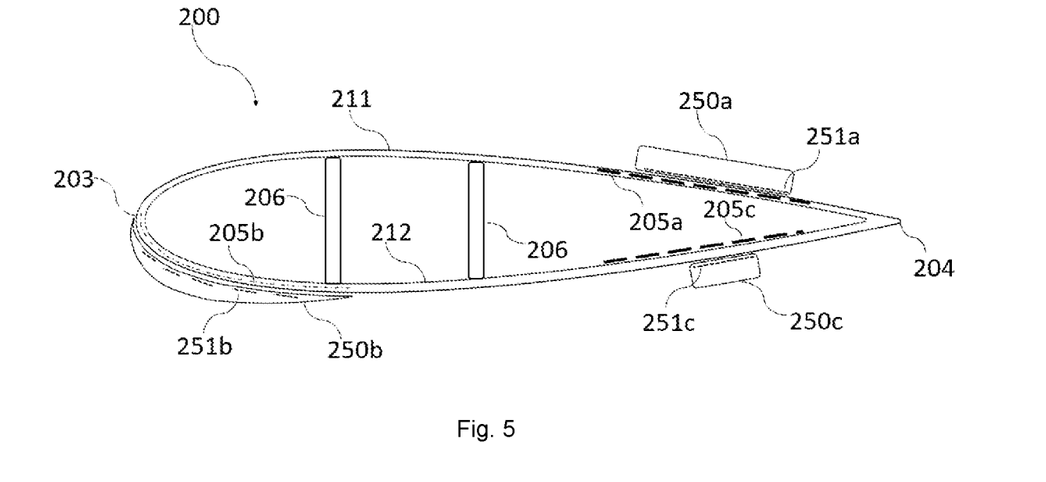
FIG. 5 schematically illustrates a wind turbine blade assembly according to yet another example through the plane A-A'.
Figure 6:
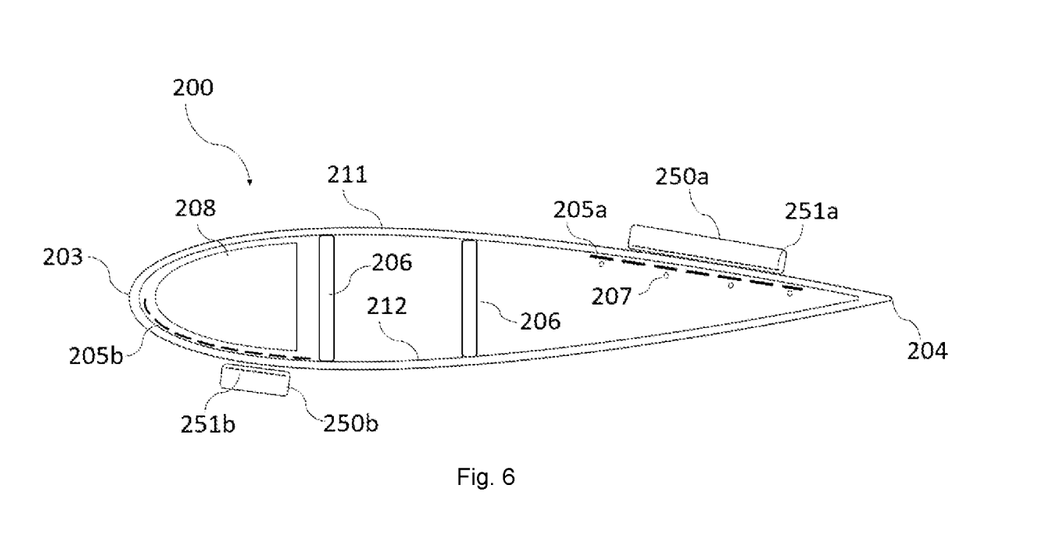
FIG. 6 schematically illustrates a wind turbine blade assembly according to still another example through the plane A-A'.

FIGS. 4 to 6 illustrate different examples of a wind turbine blade 22 and wind turbine blade assembly 200 through the plane A-A' illustrated in FIG. 3.

FIG. 4 schematically illustrates one example of a wind turbine blade 22. In the illustrated example, the first element 205 is distributed in the shell 210 as a ferromagnetic powder. The distribution of the ferromagnetic powder may be homogeneous around the blade profile or may have regions with higher concentration of ferromagnetic powder than others. In the example of FIG. 4, the peripheral devices 250a, 250b comprise a second element 251a, 251b that is a magnet. More specifically, in the present case the magnet may be a permanent magnet. Thus, the peripheral device may be passive, i.e. it does not require electric power. A passively magnetic system in the peripheral device can reduce the manufacturing, maintenance and commissioning cost. In examples wherein the first element 205 is a magnet, the magnet may be an electromagnet or a permanent magnet. In some examples, an electromagnet may be battery powered, or the peripheral device may include some form of power source. In other examples, power for activating the electromagnet may be provided externally to the peripheral device.

Further, FIG. 4 illustrates that the peripheral devices may be located at the pressure surface and at the suction surface of the wind turbine blade. The location of the peripheral devices depends on the nature and objective of the peripheral device, i.e. if it is an aerodynamic device, a damper device, sensor system, or other. Examples of the present disclosure allow locating the peripheral devices where they best suit their function, since it may be possible to carry out a magnetic coupling along an entire chord of the wind turbine blade.

FIG. 5 schematically illustrates another example of a wind turbine blade 22. In this example, the wind turbine blade 22 comprises three separate first elements 205a, 205b, 205c. The first element 205b located close to the leading edge 203 and at a pressure side of the blade may be a ferromagnetic powder included within a foam of the shell 210. Further, the peripheral device 250b associated with the first element 205b arranged near the leading edge may be e.g. an aerodynamic device 250b that comprises, at the same time, several second elements 251b in the form of permanent magnets. The distribution of first elements 205a, 205b, 205c and second elements 251a, 251b, 251c may be such as to aid in the alignment process of the peripheral devices 250a, 250b, 250c over the wind turbine blade 22. As discussed, the second elements 251a, 251b, 251c may be magnets of ferromagnetic elements, depending on the nature of the first elements 205a, 205b, 205c.

The other two first elements 205a, 205c in FIG. 5 are located in the pressure side (or pressure surface) and the suction side (or suction surface) of the wind turbine blade 22 and towards the trailing edge 204. As may be seen, one of the first elements 205c is coupled to the inner surface 212 of the shell 210 (in the example of FIG. 5 at the pressure side), whereas the other first element 205a (at the suction side in this example) is laminated into the shell 210. The associated peripheral devices may have different sizes, depending on, for example, damping requirements. Thus, a wind turbine blade assembly 200 may comprise one or more blade peripheral devices 250a, 250b, 250c such as an external mechanical blade dampers and an aerodynamic device.

Besides, the example in FIG. 5 shows that the load-bearing structure 206 may comprise two spars, although a different number of spars may be used. Also, so-called box-spars may be used. The spars extend generally along a longitudinal direction of the blade. Further, the load-bearing structure 206 may be arranged substantially in or close to a center of pressure of the blade 22, and in examples the first element 205 may be arranged between the leading edge 203 and the load-bearing structure 206 or between the trailing edge 204 and the load-bearing structure 206.

FIG. 6 schematically shows another example of a wind turbine blade 22 and assembly 200. In this example, the wind turbine blade 22 comprises two first elements 205*a*, 205*b* and the corresponding two peripheral devices 250*a*, 250*b*. Further, the wind turbine blade 22 of the example further comprises a positioning system to selectively position the first element 205*a* in a deployed position inside the wind turbine blade 22, and/or control its position.

The positioning system may comprise extension lines 207 connected to the first element 205*a* that allow retrieval of the first element 205*a* from the operational position. Such extension lines may extend e.g. from the hub and may be remotely controlled or controlled by an operator in the hub. The extension lines may be suitable ropes, cables, or wires.

Further, the positioning system may comprise guides extending along the longitudinal direction LD over which the first element 205*a* may be displaced. In examples, the positioning system may also comprise one or more travel stops in order to selectively limit the displacement of the first element 205*a* along the longitudinal direction LD. Further, the travel stops may also act as a safety measure to control the distance travelled by the first element 205*a*.

For element 205*b* arranged near a leading edge of the blade, FIG. 6 also shows that the positioning system in examples may comprise a biasing system 208 configured to promote contact between the first element 205*b* and an inner surface 212 of the shell 210. In FIG. 6, the biasing system 208 is activated, and the first element 205, i.e. a ferromagnetic element, a permanent magnet or an electromagnet, is substantially in contact with the inner surface 212 of the shell 210. The biasing system 208 may comprise a fluid driven diaphragm that, when deployed, may apply pressure against the first element 205*b* to displace it to the desired location. The working fluid may be liquid such as water, oil or other, or gas, such as air or other. In some examples, the biasing system 208 may alternatively or additionally comprise a magnet that generates a magnetic force acting over the first element 205*b*. In situations where the first element is a permanent magnet or a ferromagnetic element, the introduction of an electromagnet in the biasing system 208 may allow to selectively activate and deactivate the magnetic attraction (or repulsion) between the biasing system and the first element 205*b*. A biasing system may be combined with extension lines and guides commented on earlier.

As shown in FIG. 6, the first element 205*b* may be shaped so that to mate with an internal geometry of the wind turbine blade 22. This allows to closely fit the first element 205*b* to the inner surface 212 of the wind turbine blade 22 and may enhance the magnetic force experienced by the first element 205*b*.

Although not shown in the figures, the first elements 205 of the wind turbine blade 22 that have been shown in the different examples may be electrically coupled to earth through a down conductor. Thus, in case a lightning strikes the first element 205, the electric discharge may be directed to earth, avoiding other wind turbine components that could be damaged by the same. The coupling to the down conductor to the first element 205 may be carried out during, or after, blade manufacturing. Other components to enhance lightning protection may also be included.

Note that some of the technical features described in relation with the wind turbine blade 22 can be included in the wind turbine assembly 200, and vice versa.

Figure 7:
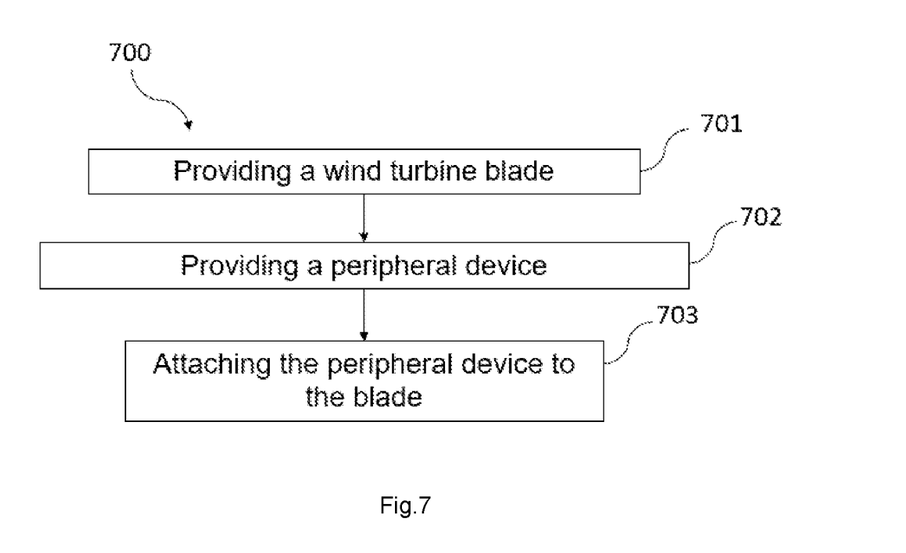
FIG. 7 is a flow diagram of a method to provide a wind turbine blade assembly according to one example.

FIG. 7 is a flow diagram of an example of a method 700 to provide a wind turbine blade assembly 200. In particular, FIG. 7 shows that the method 700 comprises, at block 701, providing a wind turbine blade 22. Further, the method 700 also comprises, at block 702, providing a peripheral device 250*a*, 250*b*, 250*c*. Additionally, the method also comprises, at block 703, attaching the peripheral device 250*a*, 250*b*, 250*c* to an outer surface 211 of the wind turbine 22 by magnetically coupling the peripheral device 250*a*, 250*b*, 250*c* to the wind turbine blade 22.

In some examples, the wind turbine blade 22 provided at block 701 may comprise a first element 205*a*, 205*b*, 205*c* that may be temporally or permanently installed in the wind turbine blade 22, and the peripheral device 250*a*, 250*b*, 250*c* provided at block 702 may comprise a second element 251*a*, 251*b*, 251*c*. As explained hereinbefore, one of the first element 205*a*, 205*b*, 205*c* and the second element 251*a*, 251*b*, 251*c* may be a magnet, and the other of the first and second element 205*a*, 205*b*, 205*c*, 251*a*, 251*b*, 251*c* may be a magnet or a ferromagnetic element. Further, in some examples, the method 700 may also comprise selectively position the first element 205*a*, 205*b*, 205*c* in a deployed position inside the wind turbine blade 22. This may be achieved by displacing the first element 205*a*, 205*b*, 205*c* inside the wind turbine blade 22 by means of a positioning system. Similarly, when the first element 205*a*, 205*b*, 205*c* is not integrally mounted to the wind turbine blade 22, the positioning system may be used to retrieve the first element 205*a*, 205*b*, 205*c* from the wind turbine blade 22. This may be performed, for example, during blade transportation or during wind turbine operation. Thus, the positioning system allows to selectively deploy and retrieve the first element 205*a*, 205*b*, 205*c* to/from desired locations of the wind turbine blade 22.

In some further examples, the method 700 may further comprise arranging the first element 205*a*, 205*b*, 205*c* substantially adjacent to the inner side 211 of the shell 210 through a biasing system 208. As previously disclosed, the biasing system may comprise a fluid driven diaphragm and a magnet to promote contact between the first element 205 and the inner side 211 of the shell 210.

Further, the method 700 may be carried out on site, either before coupling a blade 22 with the hub 20 or uptower once the blade 22 has been installed. Alternatively, the method 700 may be carried out during blade manufacturing or assembly. Additionally, the method 700 may comprise any of the technical features disclosed in relation to the wind turbine blade 22 and wind turbine blade assembly 200 and associated steps to operate the same.

In any of the examples disclosed herein, peripheral devices or the wind turbine blade may include further attachment mechanisms for strengthening the coupling. E.g. in examples, suction or vacuum devices may be used to more firmly couple the peripheral device(s) to a blade.

This written description uses examples to disclose the present teaching, including the preferred embodiments, and also to enable any person skilled in the art to practice it, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A wind turbine blade, extending in a longitudinal direction between a root end and a tip end, comprising:
    a shell having an outer surface defining a pressure surface and a suction surface, a leading edge and a trailing edge;
    a load-bearing structure extending in the longitudinal direction;
    a peripheral device magnetically coupled to a portion of the outer surface of the blade via a magnetic coupling; and
    the magnetic coupling comprising a first element formed in the shell beneath the outer surface such that the outer surface overlies the first element.

2. The wind turbine blade of claim 1, wherein the magnetic coupling comprises a second element of the peripheral device, wherein one of the first and second elements is a magnet, and the other of the first and second element elements is a magnet or a ferromagnetic element.

3. The wind turbine blade of claim 2, wherein the first element is laminated into the shell between an upper surface and an inner surface of the shell.

4. The wind turbine blade of claim 2, wherein the first element comprises a mesh integrated in the shell by resin infusion.

5. The wind turbine blade of claim 2, wherein the first element comprises a ferromagnetic powder included in a foam material of the shell.

6. The wind turbine blade of claim 2, wherein the magnet of the first element or the second element is an electromagnet or a permanent magnet.

7. The wind turbine blade of claim 2, wherein the first element is electrically coupled to earth through a down conductor.

8. The wind turbine blade of claim 2, further comprising a positioning system configured to selectively position the first element in a deployed position inside the wind turbine blade.

9. The wind turbine blade of claim 8, wherein the positioning system comprises extension lines.

10. The wind turbine blade of claim 8, wherein the positioning system comprises guides extending along the longitudinal direction over which the first element is displaced.

11. The wind turbine blade of claim 8, wherein the positioning system comprises a biasing system configured to promote contact between the first element and an inner surface of the shell.

12. The wind turbine blade of claim 11, wherein the biasing system comprises a fluid driven diaphragm.

13. A wind turbine blade assembly comprising:
    a wind turbine blade, extending in a longitudinal direction between a root end and a tip end and comprising a shell having an outer surface defining a pressure surface and a suction surface, a leading edge and a trailing edge, and a load-bearing structure extending in the longitudinal direction;
    a blade peripheral device configured to contact and conform to the outer surface of the shell;
    wherein the blade peripheral device magnetically couples to the wind turbine blade via a magnetic coupling to attach to the outer surface of the shell; and
    the magnetic coupling comprising a first element formed in the shell beneath the outer surface such that the outer surface overlies the first element.

14. The wind turbine blade assembly of claim 13, wherein the magnetic coupling comprises a second element of the blade peripheral device, wherein one of the first and second elements is a magnet, and the other of the first and second element is a magnet or a ferromagnetic element.

15. The wind turbine blade assembly of claim 14, wherein the first element is integrated in the shell between an upper surface and an inner surface of the shell.

16. The wind turbine blade assembly of claim 13, wherein the blade peripheral device comprises a damper or an aerodynamic device.

* * * * *